(12) United States Patent
Mahapatra et al.

(10) Patent No.: US 12,045,272 B2
(45) Date of Patent: Jul. 23, 2024

(54) AUTO-CREATION OF CUSTOM MODELS FOR TEXT SUMMARIZATION

(71) Applicant: ADOBE INC., San Jose, CA (US)

(72) Inventors: Saurabh Mahapatra, Sunnyvale, CA (US); Niyati Chhaya, Hyderabad (IN); Snehal Raj, Odisha (IN); Sharmila Reddy Nangi, Hyderabad (IN); Sapthotharan Nair, Cupertino, CA (US); Sagnik Mukherjee, Kolkata (IN); Jay Mundra, Chittorgarh Rajasthan (IN); Fan Du, Milpitas, CA (US); Atharv Tyagi, Uttar Pradesh (IN); Aparna Garimella, Karnataka (IN)

(73) Assignee: ADOBE INC., San Jose, CA (US)

( * ) Notice: Subject to any disclaimer, the term of this patent is extended or adjusted under 35 U.S.C. 154(b) by 379 days.

(21) Appl. No.: 17/370,899

(22) Filed: Jul. 8, 2021

(65) Prior Publication Data

US 2023/0020886 A1     Jan. 19, 2023

(51) Int. Cl.
| | | |
|---|---|---|
| *G06F 16/34* | (2019.01) | |
| *G06F 16/332* | (2019.01) | |
| *G06F 40/30* | (2020.01) | |
| *G06N 3/04* | (2023.01) | |
| *G06N 3/044* | (2023.01) | |
| *G06N 3/08* | (2023.01) | |

(52) U.S. Cl.
CPC ........ *G06F 16/345* (2019.01); *G06F 16/3329* (2019.01); *G06F 40/30* (2020.01); *G06N 3/04* (2013.01); *G06N 3/044* (2023.01); *G06N 3/08* (2013.01)

(58) Field of Classification Search
CPC ......... G06F 16/345; G06F 40/30; G06N 3/04; G06N 3/08; G06N 3/044
See application file for complete search history.

(56) References Cited

U.S. PATENT DOCUMENTS

| | | | |
|---|---|---|---|
| 2017/0053027 A1* | 2/2017 | Simske | ................. G06F 16/335 |
| 2019/0087491 A1* | 3/2019 | Bax | ...................... G06Q 10/107 |
| 2019/0287012 A1* | 9/2019 | Celikyilmaz | ......... G06F 16/345 |

(Continued)

OTHER PUBLICATIONS

Liu et al., "Text summarization with pretrained encoders." arXiv preprint arXiv:1908.08345 (Year: 2019).*

(Continued)

*Primary Examiner* — Samuel G Neway
(74) *Attorney, Agent, or Firm* — Shook, Hardy & Bacon L.L.P.

(57) ABSTRACT

A text summarization system auto-generates text summarization models using a combination of neural architecture search and knowledge distillation. Given an input dataset for generating/training a text summarization model, neural architecture search is used to sample a search space to select a network architecture for the text summarization model. Knowledge distillation includes fine-tuning a language model for a given text summarization task using the input dataset, and using the fine-tuned language model as a teacher model to inform the selection of the network architecture and the training of the text summarization model. Once a text summarization model has been generated, the text summarization model can be used to generate summaries for given text.

20 Claims, 14 Drawing Sheets

(56) References Cited

U.S. PATENT DOCUMENTS

2022/0076121 A1* 3/2022 Choi ................... G06N 3/063
2022/0156596 A1* 5/2022 Park .................... G06N 3/045
2022/0327386 A1* 10/2022 Ben-Dror ............. G06N 3/082
2023/0020886 A1* 1/2023 Mahapatra ............ G06N 3/08

OTHER PUBLICATIONS

Chen et al., "Adabert: Task-adaptive bert compression with differentiable neural architecture search.") arXiv preprint arXiv:2001.04246 (Year: 2020).*
Koto et al., "Liputan6: A large-scale Indonesian dataset for text summarization." arXiv preprint arXiv:2011.00679 (Year: 2020).*
Wang, Y., Yang, Y., Chen, Y., Bai, J., Zhang, C., Su, G., . . . & Zhou, L. (2019). TextNAS: A Neural Architecture Search Space tailored for Text Representation. arXiv e-prints, arXiv-1912.
Chen, Y. C., Gan, Z., Cheng, Y., Liu, J., & Liu, J. (Jul. 2020). Distilling Knowledge Learned in BERT for Text Generation. In Proceedings of the 58th Annual Meeting of the Association for Computational Linguistics (pp. 7893-7905).
Liu, Y., & Lapata, M. (2019). Text summarization with pretrained encoders. arXiv preprint arXiv:1908.08345.
Pham, H., Guan, M., Zoph, B., Le, Q., & Dean, J. (Jul. 2018). Efficient neural architecture search via parameters sharing. In International Conference on Machine Learning (pp. 4095-4104). PMLR.
Zoph, Barret, and Quoc V. Le. "Neural Architecture Search with Reinforcement Learning." (2017).
Jiao, Xiaoqi, et al. "Tinybert: Distilling bert for natural language understanding." arXiv preprint arXiv:1909.10351 (2019).
Devlin, J., Chang, M. W., Lee, K., & Toutanova, K. (2018). Bert: Pre-training of deep bidirectional transformers for language understanding. arXiv preprint arXiv:1810.04805.
Radford, A., Wu, J., Child, R., Luan, D., Amodei, D., & Sutskever, I. (2019). Language models are unsupervised multitask learners. OpenAI blog, 1(8), 9.
Brown, Tom B., et al. "Language models are few-shot learners." arXiv preprint arXiv:2005.14165 (2020).
Chopra, S., Auli, M., & Rush, A. M. (Jun. 2016). Abstractive sentence summarization with attentive recurrent neural networks. In Proceedings of the 2016 Conference of the North American Chapter of the Association for Computational Linguistics: Human Language Technologies (pp. 93-98).
Cohan, A., Dernoncourt, F., Kim, D. S., Bui, T., Kim, S., Chang, W., & Goharian, N. (2018). A discourse-aware attention model for abstractive summarization of long documents. arXiv preprint arXiv:1804.05685.
Durrett, G., Berg-Kirkpatrick, T., & Klein, D. (2016). Learning-based single-document summarization with compression and anaphoricity constraints. arXiv preprint arXiv:1603.08887.
Hermann, K. M., Kocisky, T., Grefenstette, E., Espeholt, L., Kay, W., Suleyman, M., & Blunsom, P. (2015). Teaching machines to read and comprehend. Advances in neural information processing systems, 28, 1693-1701.
Hutter, F., Kotthoff, L., & Vanschoren, J. (2019). Automated machine learning: methods, systems, challenges (p. 219). Springer Nature.
Lin, C. Y. (Jul. 2004). Rouge: A package for automatic evaluation of summaries. In Text summarization branches out (pp. 74-81).
Manor, Laura, Jessy Li, Junyi (2019). Plain English summarization of contracts (pp. 1-11).
Nallapati, R., Zhai, F., & Zhou, B. (Feb. 2017). Summarunner: A recurrent neural network based sequence model for extractive summarization of documents. In Thirty-First AAAI Conference on Artificial Intelligence.
Rush, A. M., Chopra, S., & Weston, J. (2015). A neural attention model for abstractive sentence summarization. arXiv preprint arXiv:1509.00685.
See, A., Liu, P. J., & Manning, C. D. (2017). Get to the point: Summarization with pointer-generator networks. arXiv preprint arXiv:1704.04368.
Williams, R. J. (1992). Simple statistical gradient-following algorithms for connectionist reinforcement learning. Machine learning, 8(3), 229-256.
Zhang, J., Zhao, Y., Saleh, M., & Liu, P. (Nov. 2020). Pegasus: Pre-training with extracted gap-sentences for abstractive summarization. In International Conference on Machine Learning (pp. 11328-11339). PMLR.

* cited by examiner

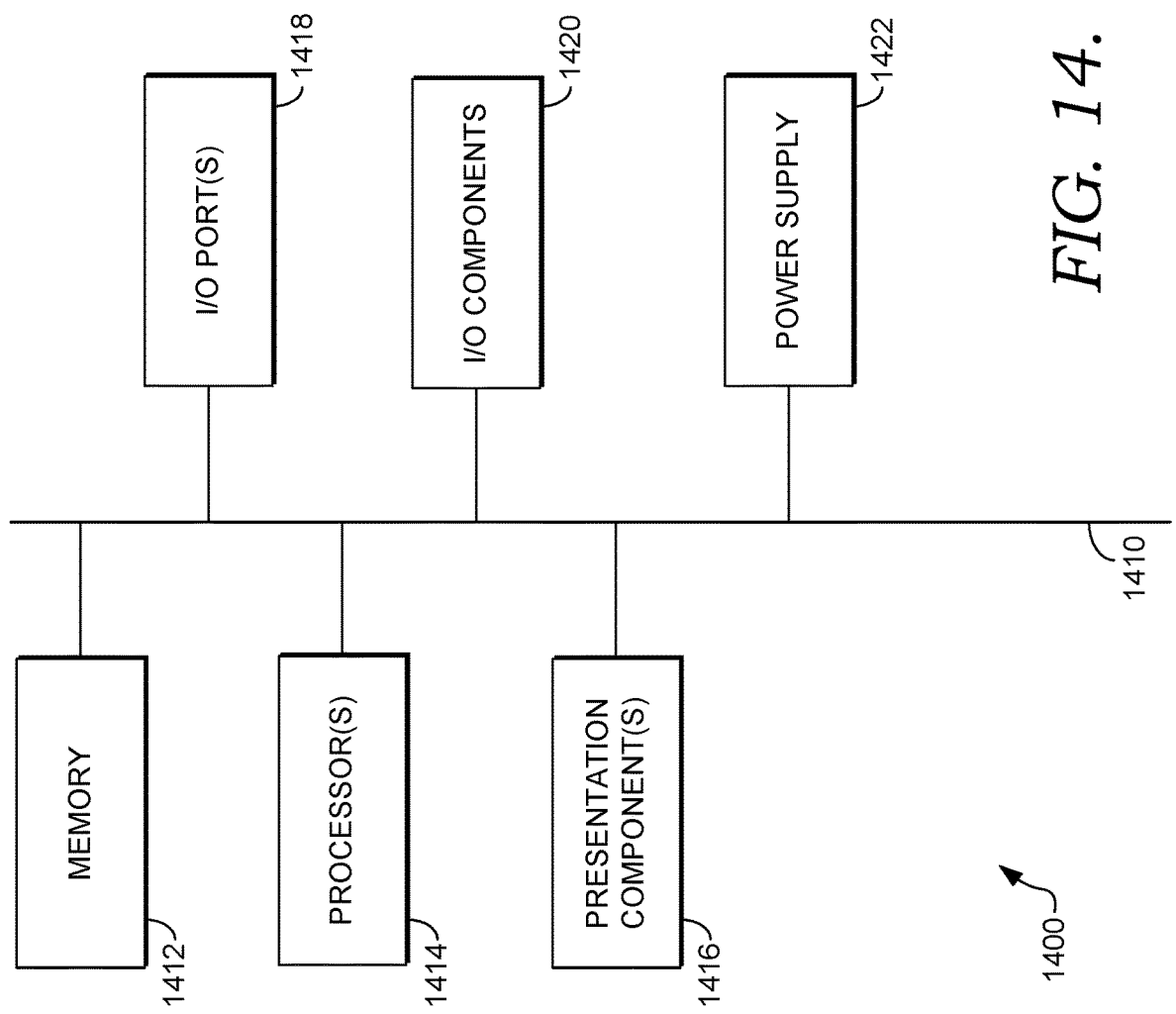

AUTO-CREATION OF CUSTOM MODELS FOR TEXT SUMMARIZATION

BACKGROUND

Text summarization is a natural language processing (NLP) task in which language models take text (e.g., a single document) as input and generate a summary of the text. Two specific types of text summarization tasks include extractive summarization and abstractive summarization. Extractive summarization refers to the task of extracting or choosing "important" phrases or sentences from a document. Given an input document $X=\{s_1, s_2, \ldots s_n\}$ (where $s_i=\{x_{i1}, x_{i2}, \ldots, x_{ik}\}$, is a sentence in the document with $x_{ik}$ tokens), the goal is to identify a sequence $Y=\{y_1, y_2, \ldots, y_n\}$, where $y_i \in (0,1]$ denotes the importance of a sentence. The extractive summary of the document is constructed by selecting the sentences/phrases with highest scores. Abstractive summarization refers to rewriting or generation of a new text as against reusing of content when creating a summary. In several applications, a mere extraction (or text reuse) does not provide the right representation of the original document. Formally, given an input document $X=\{x_1, x_2, \ldots, x_m\}$, with $x_m$ tokens, the goal is to generate sentences (in the form of sequence of tokens $<y_1, y_2, \ldots, y_t>$) that summarize the document succinctly. This may be useful, for instance, in situations where reusing the original text from a document may lead to legal or copyright consequences.

There is a wide range of applications of text summarization—the goal of many applications being the creation of a summary that provides a succinct representation of a given long form document to allow easy consumption and quick understanding of the whole content in just a glance. By way of example, marketers have a constant need to consume, consolidate, and derive market insights and competitive intelligence from a plethora of information sources to drive their strategies. In this context, summaries generated by text summarization models allow marketers to more quickly and effectively achieve these goals. However, existing text summarization technologies present a number of drawbacks. For instance, available text summarization models often perform well for generic data but are unsuited for documents with specialized terminology. Generation of custom text summarization models requires machine learning expertise and demands large datasets for training. The text summarization models are also computationally large such that they cannot be deployed on computing devices with limited resources.

SUMMARY

Embodiments of the present invention relate to, among other things, a text summarization system that auto-generates text summarization models using a combination of neural architecture search and knowledge distillation. Given an input dataset for generating/training a text summarization model, neural architecture search is used to sample a search space to select a network architecture for the text summarization model. Knowledge distillation includes fine-tuning a language model for a given text summarization task using the input dataset, and using the fine-tuned language model as a teacher model to inform the selection of the network architecture and the training of the text summarization model. Once a text summarization model has been generated, the text summarization model can be used to generate summaries for given text.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 14 is a block diagram of an exemplary computing environment suitable for use in implementations of the present disclosure.

DETAILED DESCRIPTION

Overview

Figure 1:
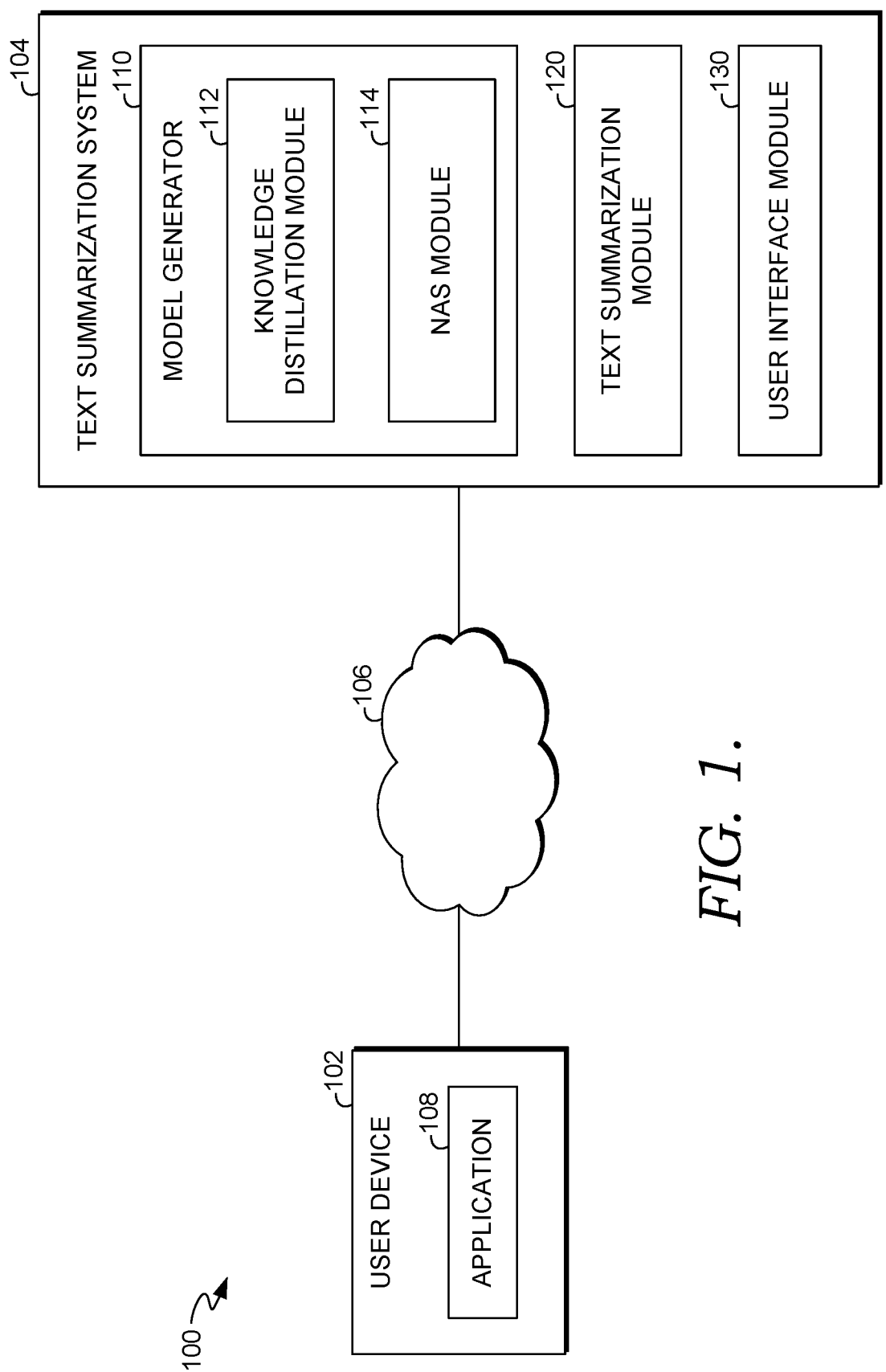
FIG. 1 is a block diagram illustrating an exemplary system in accordance with some implementations of the present disclosure.

Existing text summarization technologies present a number of drawbacks. For instance, available text summarization models typically perform well for generic data but fail to generate accurate summaries for documents from certain domains with specialized vocabulary/terminology. While text summarization models can be custom-generated to provide better performance for documents from a specific domain, this requires data-scientists with advanced machine learning expertise to design and deploy the custom text summarization models. Additionally, generation of custom text summarization models with good performance demands large datasets for training, which may not be available in certain cases. Existing text summarization models also tend to be large models that are computationally expensive such that they cannot be deployed on computing devices with limited computational resources.

Embodiments of the present invention address the shortcomings of prior text summarization approaches by providing a text summarization system that auto-generates text summarization models for extractive and abstractive summarization. The text summarization system uses a combination of neural architecture search and knowledge distillation. An input dataset is provided as input to the text summarization system for generating a text summarization model. The input dataset may come from a specific domain providing examples that guide the text summarization system to learn the terminology from the given domain. Additional input may be provided to guide the model generation process, such as an indication of the text summarization task, the summary size, the model size, the number of layers, and the number of epochs, among other possible parameters that may be specified.

Given the input dataset, a language model (which may comprise, for instance, a large transformer-based model) is fine-tuned for a specific text summarization task (i.e., extractive or abstractive summarization) using the input dataset. The fine-tuned language model is employed as a teacher model that informs the neural architecture search, which involves a reinforcement learning process in which an optimal network architecture for the text summarization model is learned. At each iteration of the neural architecture search process, a controller samples a search space to select a network architecture for the text summarization model being generated. In some instances, the text summarization model comprises an encoder and a decoder, in which the network architecture of the encoder is learned from the neural architecture search and the decoder is pre-configured for each text summarization task. The text summarization model is trained to minimize a total loss, which may be based on a knowledge distillation loss as a function of soft labels from the fined-tuned language model and a cross-entropy loss as a function of ground truth labels from the input dataset. The performance of the text summarization model is assessed (for instance, based on a validation loss generated using validation data) to generate a reward that is fed back to the controller for selecting a better network architecture in the next iteration. Once the text summarization model has been generated, it may be used to generate summaries from input text submitted to the system.

The technology described herein provides a number of improvements over existing text summarization technologies. For instance, the text summarization system enables the generation of text summarization models that are custom-tailored to specific content (e.g., content having unique terminology). Additionally, the text summarization models that are custom-created by the technology described herein achieve near state-of the-art results on accuracy, while being extremely cost efficient by decreasing the model size, diskspace, and inference time relative to existing text summarization models. Further, the text summarization system described herein is able to generate text summarization models with limited training data by transferring knowledge from large language models. As such, the text summarization models generated by the technology described herein provide good performance even with limited availability of training data, thereby reducing the dependency on large corpora for training. Still further, the technology described herein provides user interfaces that enable a non-expert to create text summarization models in an intuitive manner with just a few inputs, while also providing the ability to control various parameters of model creation.

Example System for Generating NLP Models for Text Summarization

With reference now to the drawings, FIG. 1 is a block diagram illustrating an exemplary system for the auto-creation of NLP models for text summarization using knowledge distillation and neural architectural search in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 and a text summarization system 104. Each of the user device 102 and text summarization system 104 shown in FIG. 1 can comprise one or more computer devices, such as the computing device 1400 of FIG. 14, discussed below. As shown in FIG. 1, the user device 102 and the text summarization system 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present invention. Each may comprise a single device or multiple devices cooperating in a distributed environment. For instance, the text summarization system 104 could be provided by multiple server devices collectively providing the functionality of the text summarization system 104 as described herein. Additionally, other components not shown may also be included within the network environment.

The user device 102 can be any type of computing device, such as, for instance, a personal computer (PC), tablet computer, desktop computer, mobile device, or any other suitable device having one or more processors. As shown in FIG. 1, the user device 102 includes an application 108 for interacting with the text summarization system 104. The application 108 can be, for instance, a web browser or a dedicated application for providing functions, such as those described herein. In some configurations, the application 108 may comprise some or all components of the text summarization system 104.

At a high level, the text summarization system 104 generates a text summarization model using a combination of knowledge distillation and neural architecture search. Once generated, the text summarization model can be used to generate summaries of input texts (i.e., single documents). As shown in FIG. 1, the text summarization system 104 includes a model generator 110, a user interface module 120, and a text summarization module 130. These components may be in addition to other components that provide further additional functions beyond the features described herein. The text summarization system 104 can be implemented using one or more server devices, one or more platforms with corresponding application programming interfaces, cloud infrastructure, and the like. While the text summarization system 104 is shown separate from the user device 102 in the configuration of FIG. 1, it should be understood that in other configurations, some or all of the functions of the text summarization system 104 can be provided on the user device 102. For instance, in some embodiments, the text summarization system 104 is provided entirely on the user device 102.

The model generator 110 employs a combination of knowledge distillation and neural architecture search to generate text summarizations models for specific text summarization tasks, including extractive summarization and abstractive summarization. A text summarization model is generated by the model generator 110 using an input dataset provided by a user. The input dataset may comprise custom data that guides the model generator 110 on how the text summarization model should generate summaries from text. For instance, the input dataset may include a number of examples in which each example provides a sample text and a sample summary of the sample text. As such, the input dataset provides information regarding how summaries should be generated from text. In some instances, the model generator 110 can determine the type of summarization task (i.e., extractive or abstractive) from the examples in the input dataset. Additionally, the input dataset may be directed to a domain that users specific terminology. As such, the model generator 110 can generate a text summarization model that is designed to handle text from that a domain using similar terminology. The input dataset may be divided into training data, validation data, and/or testing data for use by the model generator 110 to train, validate, and/or test a text summarization model.

As shown in FIG. 1, the model generator 110 includes a knowledge distillation module 112 and a neural architecture search (NAS) module 114. The knowledge distillation module 112 leverages knowledge from a large language model to inform the search and training of a text summarization model being generated. Given an input dataset and identification of a specific task (i.e., extractive summarization or abstractive summarization), the knowledge distillation module 112 fine-tunes a language model to provide a fine-tuned language model that is used as a teacher model to help train the text summarization model being generated. The NAS module 114 searches for a network architecture for the text summarization model being generated that achieves an optimized performance for the specific extractive summarization or abstractive summarization task. Additional details regarding the operations of the knowledge distillation module 112 and NAS module 114 are provided below with reference to FIGS. 2 and 3.

Once a text summarization model has been generated by the model generator 110, the text summarization module 130 uses the text summarization model to generate summaries for input texts provided by a user. In particular, a user can submit an input text to the text summarization system 104. The text summarization module 130 feeds the input text to the text summarization model, which outputs a summary according to the specific text summarization task for which the text summarization model has been trained—i.e., either an extractive summary or an abstractive summary.

Figure 4:
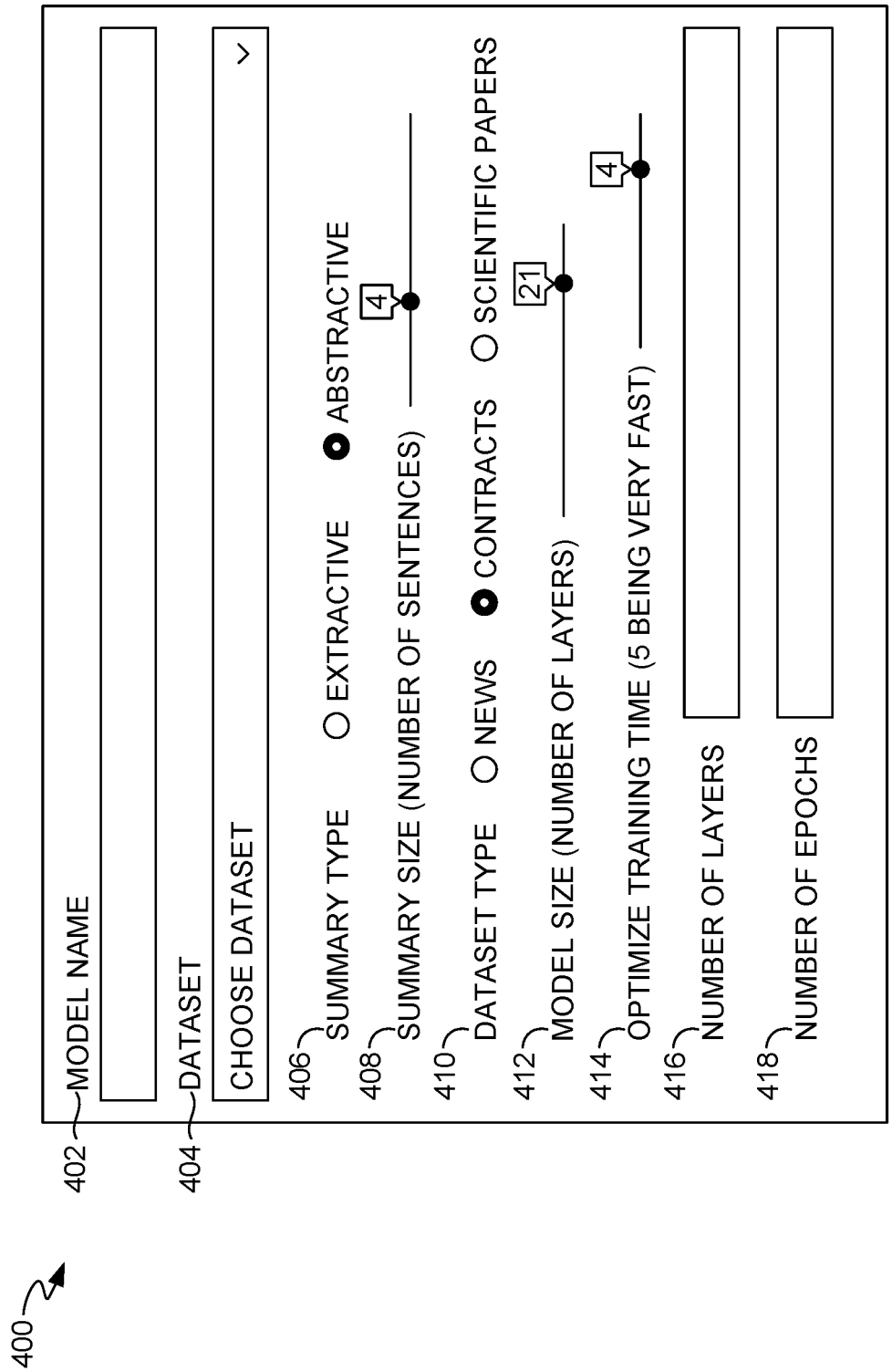
FIG. 4 is diagram showing a user interface for accepting input for use in generating a text summarization model in accordance with some implementations of the present disclosure.

The user interface module 120 provides one or more user interfaces enabling a user to interact with the text summarization system 104. Among other things, the user interface module 120 provides user interfaces allowing a user to provide inputs that control aspects regarding generation of a text summarization model. FIG. 4 provides an example of a user interface 400 that facilitates a user providing input for generating a text summarization model. As shown in FIG. 4, the user interface 400 allows a user to enter a model name 402 and provide an input dataset 404. In some configurations, no input beyond an input dataset is needed for generating a text summarization model. However, in some configurations, the text summarization system 104 enables a user to provide additional input to control various aspects of the model generation. For instance, the user interface 400 allows a user to specify various parameters, such as: the type of summarization task 406, the size of the summary 408, the dataset type 410, the model size 412, the training time 414, the number of layers of the text summarization model 416, and the number of epochs 418. It should be understood that the parameters shown in FIG. 4 are provided by way of example only and not limitation.

The user interface module 120 also provides user interfaces allowing a user to generate summaries using a text summarization model generated by the model generator 110. The user interfaces may allow a user to submit input text to the text summarization system 104 and view the summary generated by the text summarization module 130 using the text summarization model.

Figure 2:
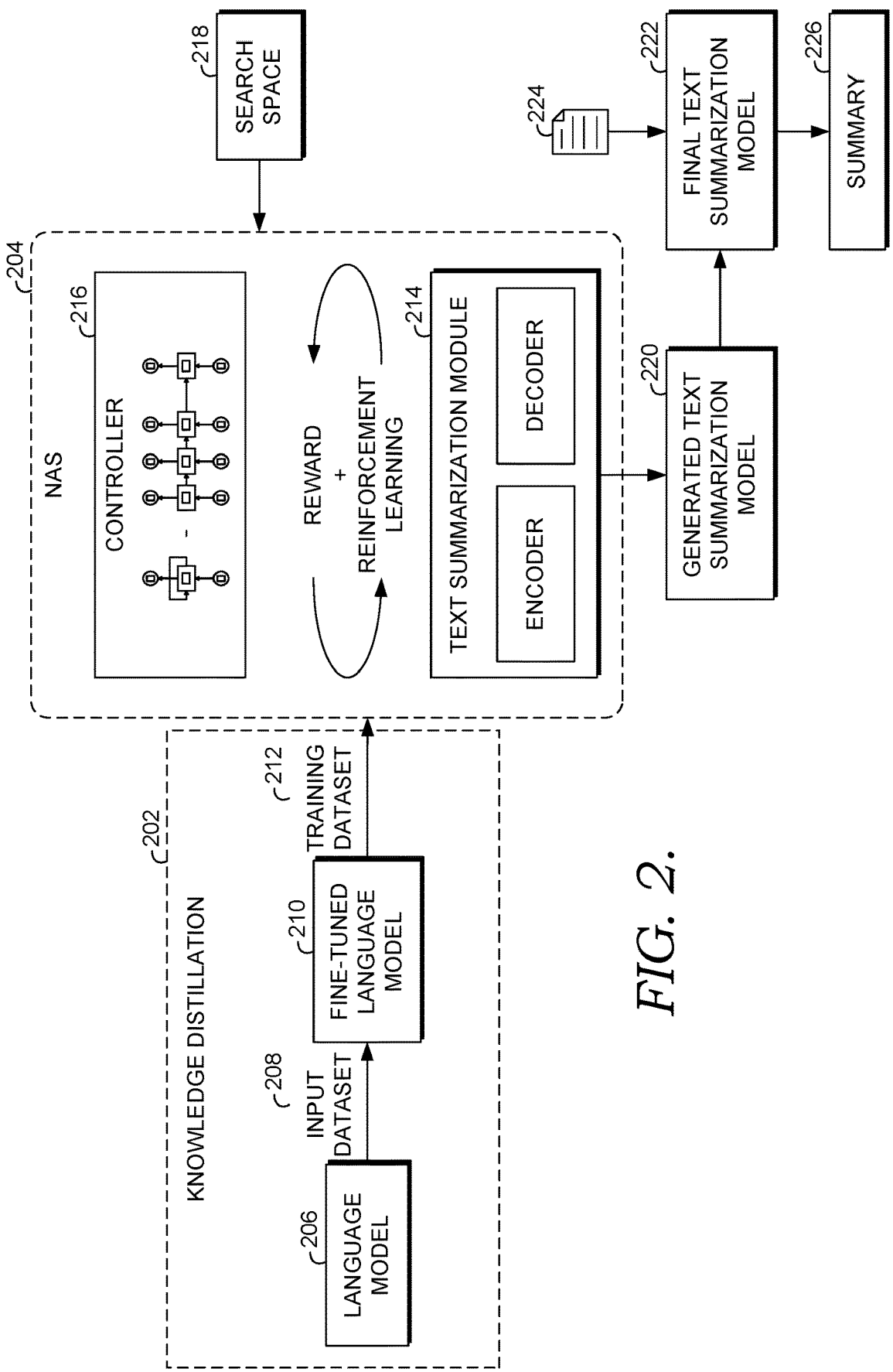
FIG. 2 is a diagram illustrating operation of a text summarization system in accordance with some implementations of the present disclosure.

Turning next to FIG. 2, a diagram is provided illustrating operation of the text summarization system 104 to auto-generate a text summarization model and use the text summarization model to generate a summary from input text in accordance with some aspects of the technology described herein. As shown in FIG. 2, the process combines knowledge distillation 202 with neural architectural search (NAS) 204 to automatically generate a text summarization model.

Knowledge distillation. Knowledge distillation 202 leverages language knowledge from a language model 206 to inform search and training of a text summarization model 214 being generated. In some configurations, the language model 206 may be a large transformer-based language model. By way of example only and not limitation, the BERT (Bidirectional Encoder Representations from Transformers) model may be used as the base architecture for the language model 206.

The language model 206 is fine-tuned for a specific text summarization task (i.e., extractive or abstractive text summarization) using an input dataset 208, thereby providing a fine-tuned language model 210. The input dataset 208 may include, for instance, a number of examples, in which each example includes an original text and a summary of the original text (e.g., summaries manually generated by a user). Fine-tuning the language model 206 to provide the fine-tuned language model 210 may include, for instance, adding additional layers to the language model 206 such that the fine-tuned language model 210 is better suited for the text summarization task and/or the terminology used in the input dataset 208 (e.g., in the case that the examples are provided from a specific domain). In some cases, a user may explicitly indicate that text summarization task as either an extractive text summarization task or an abstractive text summarization task. In other instances, the text summarization task may be inferred from the input dataset 208. For instance, the input dataset 208 may include examples in which all sentences in the summaries correspond exactly with sentences in the original texts, indicating extractive text summarization. Alternatively, the input dataset 208 may include examples in which sentences in the summaries do not correspond exactly with sentences in the original texts, indicating abstractive text summarization.

The fine-tuned language model 210 acts as a teacher model in which predictions from the fine-tuned language model 210 are used to inform the generation process for the text summarization model 214. In particular, the fine-tuned model 210 is used to create a training dataset 212 in which sentence scores (for extractive text summarization) or probability distributions over the vocabulary (for abstractive text summarization) are augmented to the ground truth (i.e., from the input dataset 208). This training dataset 212 is used in NAS 204 to inform the architecture selection and training of the text summarization model 214 as will be described in further detail below.

In the case of extractive summarization, the training dataset 212 comprises an augmented dataset that has both the ground truth labels from the input dataset 208 as well as the soft labels predicted by the fine-tuned learning model 210. The goal here is to have the text summarization model 214 (i.e., the child or student model) mimic the fine-tuned learning model 210 (i.e., the teacher model). This may be accomplished using a knowledge distillation loss that is a mean squared error (MSE) between the soft labels from the training dataset 212 and sentence scores predicted by the text summarization model 214 being generated. The associated knowledge distillation loss, $L_{KD}$, is given by:

$$L_{KD} = \Sigma_{i=1}^{n}(y_i^{teacher} - y_i^{child})^2$$

where $y_i^{teacher}$ and $y_i^{child}$ are sentence scores predicted by the fined-tuned language model 210 (i.e., soft labels from the teacher model) and the text summarization model 214 (i.e., child model), respectively.

For abstractive summarization, the knowledge distillation loss is calculated at each time step using soft labels over the vocabulary distribution predicted by the fine-tuned learning model 210. The knowledge distillation loss, $L_{KD}$, is given by:

$$L_{KD} = \sum_{t}\sum_{w \in V} P_{teacher}(y_t = w|y_{1:t-1}, X) \cdot \log(P_{pred}(y_t = w|y_{1:t-1}, X))$$

where V is the vocabulary, $P_{teacher}(y_t)$ is the estimation made by the fine-tuned language model 210 (i.e., soft target from the teacher model) and $P_{pred}(y_t)$ is the probability distribution predicted by the text summarization model 214 (i.e., child model) at time step t.

Neural Architectural Search.

The goal of NAS 204 is to select an optimal neural-network architecture for the text summarization model 214 that achieves the best performance for the given text summarization task (i.e., extractive summarization or abstractive summarization). At a high level, NAS 204 includes a controller 216 that searches a search space 218 to select the network architecture for the text summarization model 214 in an iterative process using reinforcement learning.

Figure 3:
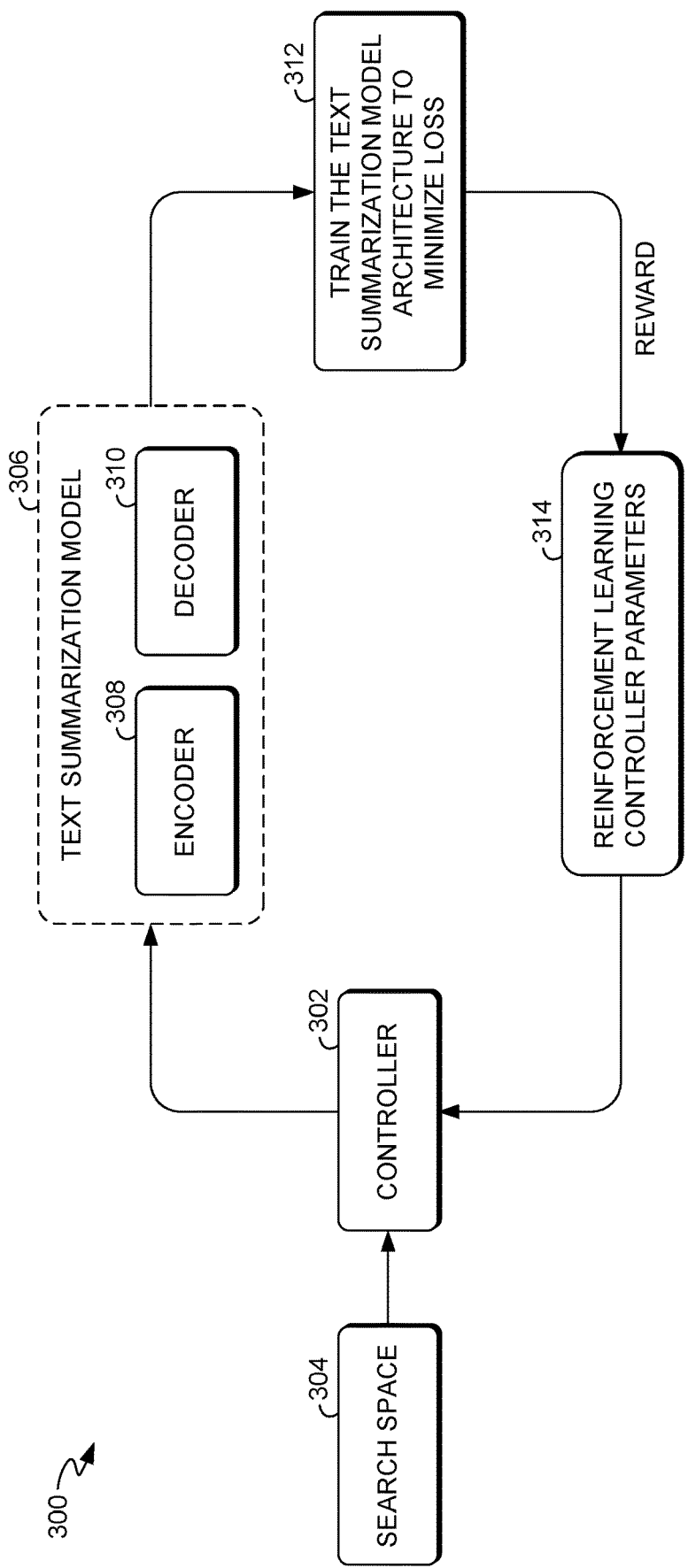
FIG. 3 is a diagram illustrating a neural architecture process for generating a text summarization model in accordance with some implementations of the present disclosure.

FIG. 3 provides a specific logical workflow for a neural architecture search (NAS) process 300 in accordance with some aspects of the technology described herein. As shown in FIG. 3, a controller 302 samples a search space 304 to select a network architecture for the text summarization model 306 being generated. The controller 302 may comprise, for instance, a recurrent neural network (RNN)-based controller.

In some configurations, the search space 304 is represented by a directed acyclic graph (DAG), where each node represents a layer from the search space 304 and edges represent the directionality of flow of information across them. In some cases, the search space 304 may be constrained by: (1) defining the number of skip connections allowed; (2) limiting the maximum number of layers in the new architecture; 1 (e.g., $l \in \{1,5,10,18,20\}$); and (3) defining the cells allowed in the new architecture. By way of example only and not limitation, the search space 304 may include 4 key cell types: convolutional neural network (e.g., kernel sizes 1,3,5,7); recurrent neural network (e.g., bidirectional GRU); pooling layers (e.g., avg. pool and max. pool with stride 1 and uniform padding); and multi-head self-attention (e.g., 8 heads, no positional embeddings). These constraints may be used to define the possibilities for the NAS process 300.

In the configuration of FIG. 3, the text summarization model 306 comprises an encoder-decoder network in which the network architecture of the encoder 308 is being selected by the controller 302, while the decoder 310 is pre-defined for each text summarization task. For extractive summarization, the decoder 310 may comprise a scorer function with sigmoid activation, which takes in text representations learnt from the encoder 308 and scores each sentence on a scale of (0,1). The sentences with the highest scores are chosen as the final summary based on the summary size specified. For abstractive summarization, the decoder 310 may comprise a RNN, which takes in text representations from the encoder 308 and outputs a generated summary, for instance, in auto-regressive manner, by decoding a word at every time step.

The NAS process 300 employs a reinforcement-learning-based algorithm, such as ENAS, to nudge the controller 302 towards selecting an optimal network architecture for the encoder 308 of the text summarization model 306. At each iteration, the controller 302 selects a network architecture for the encoder 308, and the text summarization model 306 is trained to minimize total loss and thereby increase the performance of the text summarization model 306, as shown at block 312. The total loss associated with this framework may be given by a weighted sum of the loss due to knowledge distillation (i.e., $L_{KD}$, as defined for extractive summarization and abstractive summarization above) and cross-entropy loss due to neural architecture search, $L_{CE}$. For instance, the total loss, $L_{total}$, may given by:

$$L_{total} = \alpha \cdot L_{CE} + (1-\alpha) \cdot L_{KD}$$

where $\alpha$ is a hyperparameter used to balance between the contribution of the constituent losses.

The cross-entropy loss may be taken at sentence level for extractive summarization and vocab level for abstractive summarization. More particularly, for extractive summarization, the input to the encoder 308 are sentence embeddings, and the cross-entropy loss is based on the predicted labels/scores ($Y^{pred}$) from the text summarization model 306 and the ground truth labels ($P_{gt}$) from the input dataset, as follows:

$$L_{CE} = -\sum_{i=1}^{n} P_{gt}(y_i) \cdot \log(y_i^{child})$$

In the case of abstractive summarization, word embeddings are used as input to the encoder 308, which may be coupled with an attention layer before the final decoder, and the cross-entropy loss is given by:

$$L_{CE} = \sum_{t}\sum_{w \in V} P_{gt}(y_t = w) \cdot \log(P_{pred}(y_t = w|y_{1:t-1}, X)$$

As shown at block 314, a feedback is derived from the performance of the text summarization model 306, in the form of a reward, and sent back to the controller 302, causing the controller 302 to sample better architectures in the next step. In some configurations in which the controller 302 is a RNN, this may include updating the policy gradients of the RNN through the REINFORCE algorithm. In some configurations, the reward may be based on a validation loss, $L_{valid}$, determined for the text summarization model 306 using validation data. For instance, the reward, R, may be defined as follows:

$$R=1-L_{valid}(\text{normalized over the batchsize})$$

Returning to FIG. 2, when the NAS process 204 is completed, a generated text summarization model 220 is provided. In some configurations, the generated text summarization model 220 is the final model that may be used to generate summaries. However, in the configuration shown in FIG. 2, the generated text summarization model 220 is re-trained using user-provided training data optimizing for the total loss. This provides a final text summarization model 222 that is shared with the user. The final text summarization model 222 may then be employed to generate a summary 226 for an input text 224.

Figure 5:
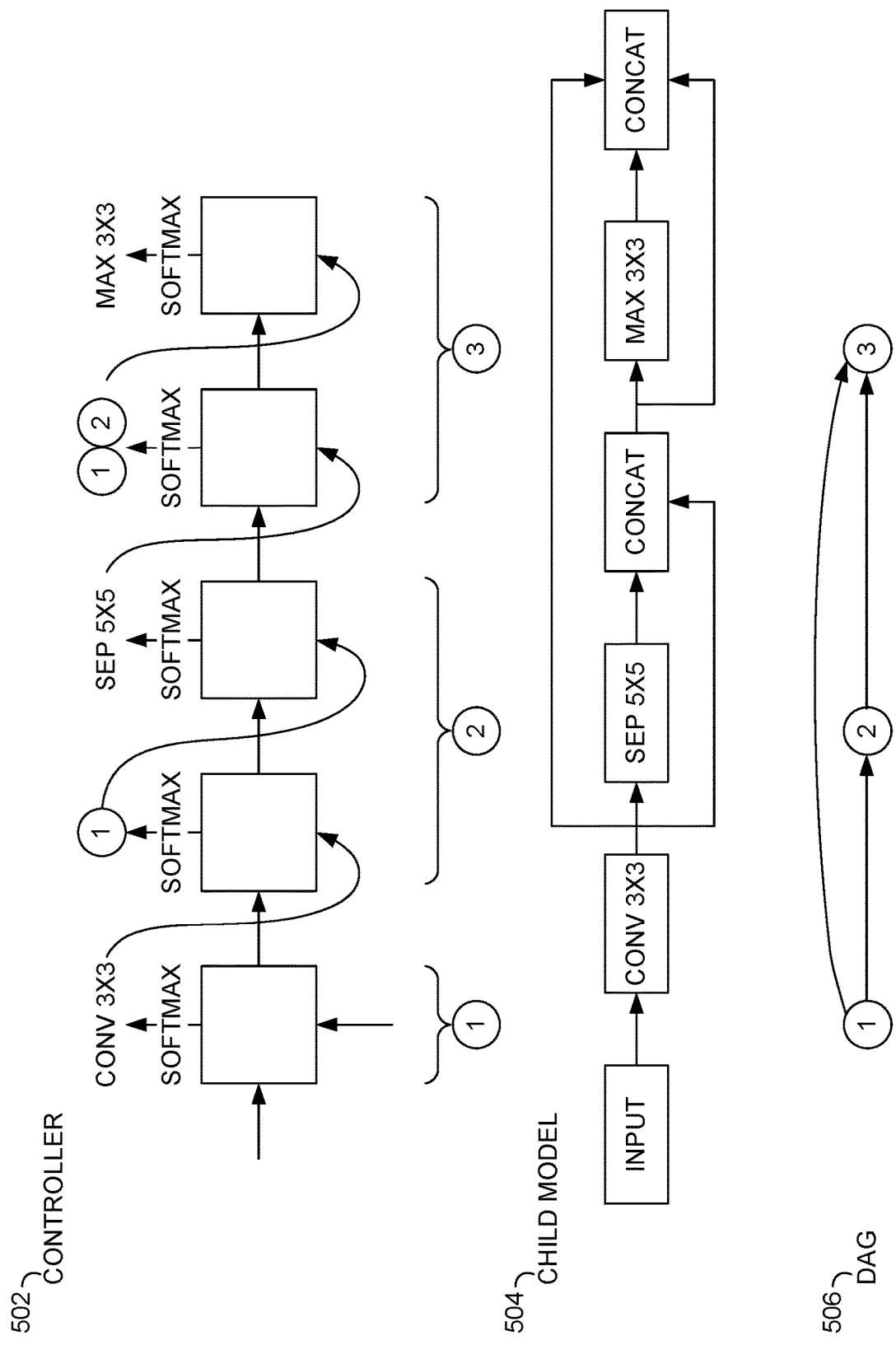
FIG. 5 is a diagram showing examples of a controller, text summarization model, and directed acyclic graph in accordance with some implementations of the present disclosure.
Figure 6:
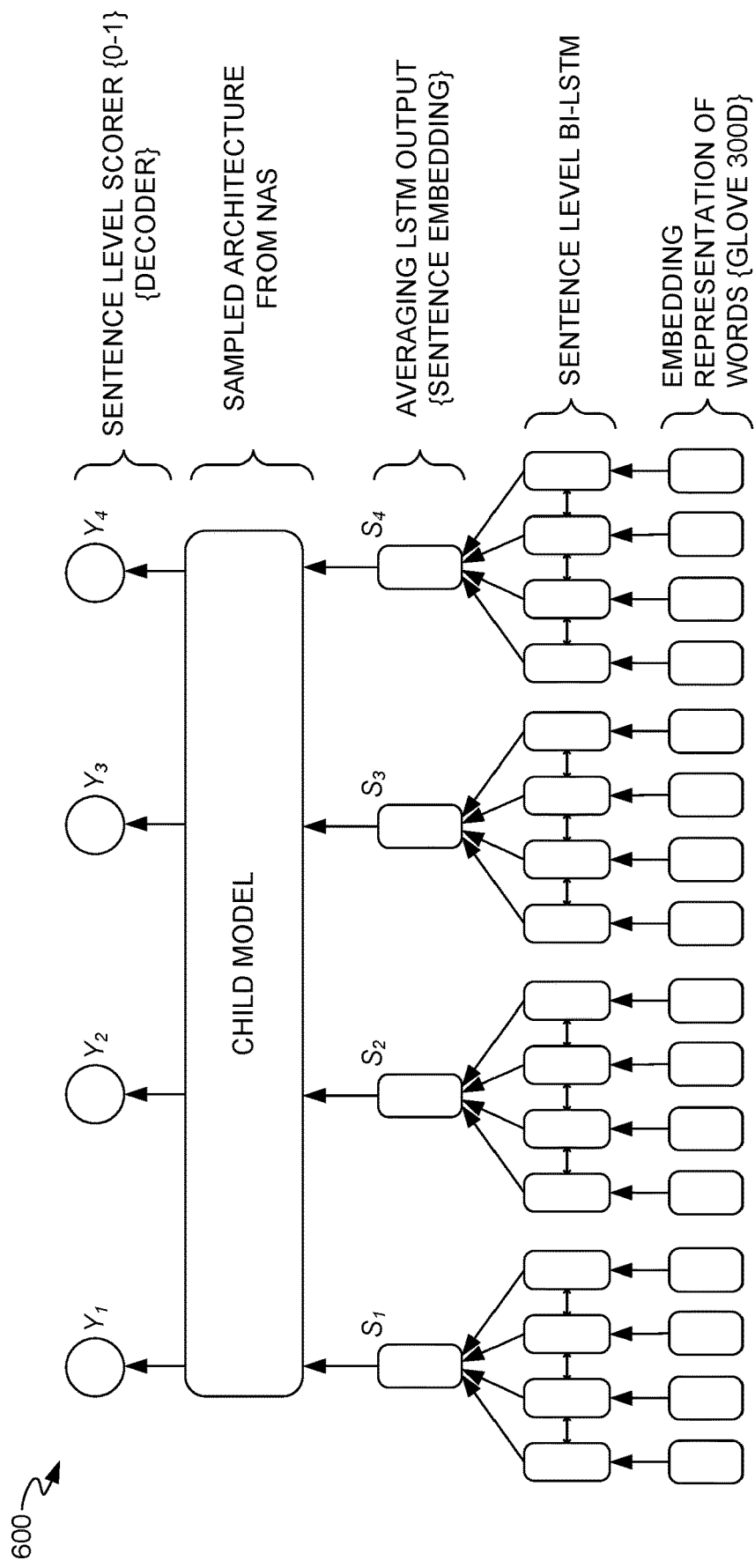
FIG. 6 is a diagram showing an example of a generated text summarization model for extractive summarization in accordance with some implementations of the present disclosure.
Figure 7:
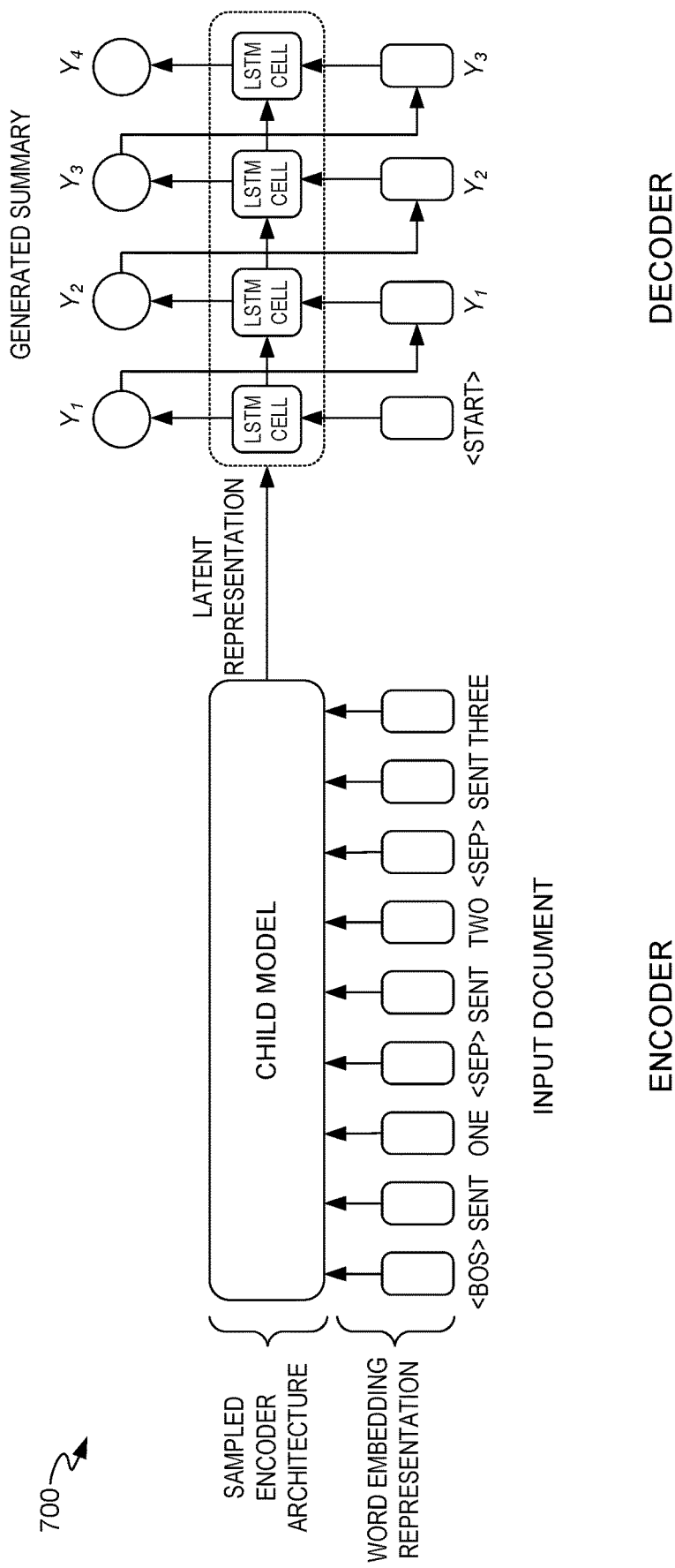
FIG. 7 is a diagram showing an example of a generated text summarization model for abstractive summarization in accordance with some implementations of the present disclosure.

An example of a controller 502, child model 504, and a DAG 506 created by the controller that may be employed by the text summarization system is shown in FIG. 5. Additionally, FIGS. 6 and 7 provide examples of final text summarization models provided by the text summarization system. In particular, FIG. 6 illustrates an example of a final text summarization model 600 for extractive summarization, and FIG. 7 illustrates an example of a final text summarization model 700 for abstractive summarization.

Example Method for Generating NLP Models for Text Summarization

Figure 8:
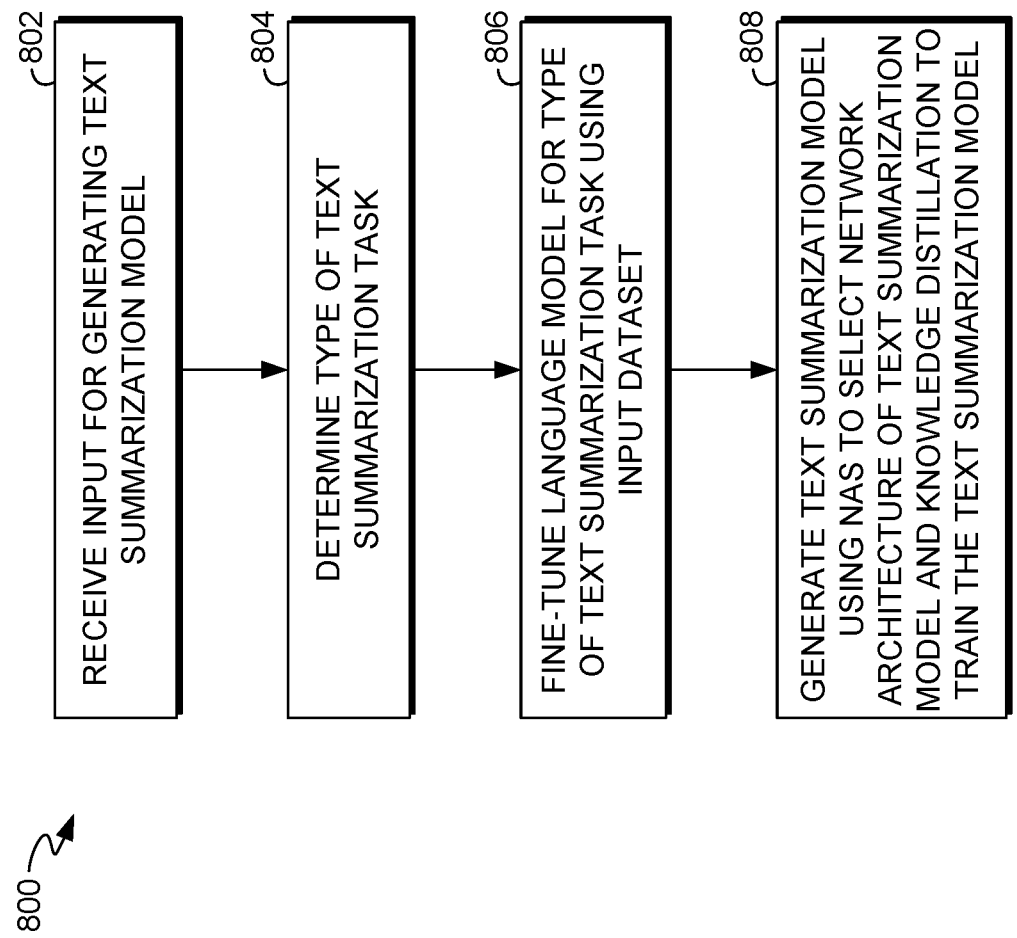
FIG. 8 is a flow diagram showing a method for generating a text summarization model in accordance with some implementations of the present disclosure.

With reference now to FIG. 8, a flow diagram is provided that illustrates a method 800 for generating a text summarization model. The method 800 may be performed, for instance, by the text summarization system 104 of FIG. 1. Each block of the method 800 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 802, input is received for generating a text summarization model. The input may be received via a user interface, such as the user interface 400 of FIG. 4. The input includes an input dataset for training the text summarization model. The input dataset may include, for instance, a number of examples with each sample including a sample text and a sample summary of the sample text. This provides information that can be used to drive the generation of the text summarization model such that the model can generate similar summaries. Other input may be received in addition to the input dataset. For instance, the input may specify various parameters, such as the type of summarization task, the size of the summary (e.g., number of sentences), the model size, the training time, the number of layers of the text summarization model, and the number of epochs.

A type of text summarization task for the text summarization model is determined, as shown at block 804. In particular, the text summarization task may be an extractive summarization task or an abstractive summarization task. In some instances, the type of text summarization task is determined based on explicit input received at block 802. For instance, the user can manually specify the type of text summarization task. In other instances, the type of text summarization task may be inferred from the input dataset. For instance, if the input dataset includes examples in which each sample summary includes exact sentences from the sample text, the system can infer an extractive summarization task. Otherwise, the system can infer an abstractive summarization task.

As shown at block 806, a language model is fined-tuned for the type of text summarization task using the input dataset. This provides a fine-tuned language model. In some configurations, the language model may be a large transformer-based language model, such as a BERT model. Fine-tuning the language model may include, for instance, adding additional layers to the language model such that the fine-tuned language model is better suited for the text summarization task, as well as being better suited to handle the terminology used in the input dataset (e.g., in the case that the examples are provided from a specific domain).

A text summarization model is generated at block 808. The text summarization model is generated using neural architecture search to select the network architecture of the text summarization model with knowledge distillation leveraging the fine-tuned language model as a teacher model to inform the network architecture selection and training of the text summarization model.

Figure 9:
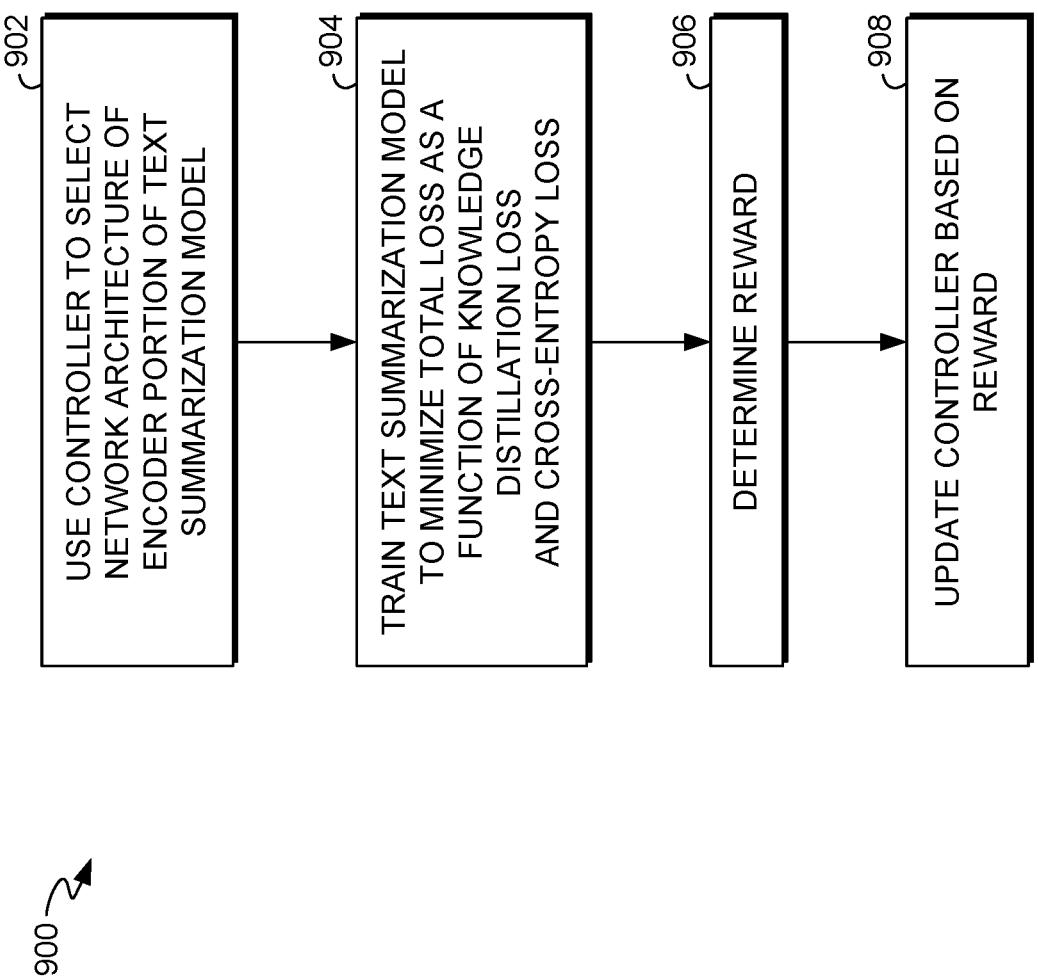
FIG. 9 is a flow diagram showing a method for selecting a network architecture of a text summarization model and training the text summarization model in accordance with some implementations of the present disclosure.

FIG. 9 is a flow diagram showing a method 900 for selecting a network architecture of a text summarization model and training the text summarization model (e.g., used at block 808 of FIG. 8). The process shown by the method 900 may be an iterative process in which the method 900 is repeated until convergence or some other stopping point is reached. As shown at block 902, a controller is used to select a network architecture of the encoder portion of a text summarization model that pairs the encoder to a pre-configured task-specific decoder. The controller can select the network architecture by sampling a search space as described hereinabove.

The text summarization model with the encoder having a network architecture selected by the controller is trained at block 904. The text summarization model may be trained to minimize a total loss that is a function of both knowledge distillation loss and cross-entropy loss. The loss functions may be taken at sentence level for extractive summarization and vocab level for abstractive summarization. As described hereinabove, the knowledge distillation loss is a function of soft labels from the fine-tuned language model (e.g., generated at block 806 of FIG. 8); while the cross-entropy loss is a function of ground truth labels from training data in the input dataset.

As shown at block 906, a reward is determined for reinforcement learning purposes. The reward may be determined by accessing the performance of the text summarization model, for instance, via a validation loss determined using validation data from the input dataset. The controller is updated based on the reward, as shown at block 908. In instances in which the controller is an RNN, this may include updating the policy gradients of the RNN, for instance, through the REINFORCE algorithm. The controller is updated with the intent of improving the controller's ability to select a network architecture that will provide a text summarization model with better performance at the next iteration. As noted above, the method 900 is repeated until convergence or some other stopping point is reached, at which a generated text summarization model is provided. In some configurations, the generated text summarization may be further retrained.

Figure 10:
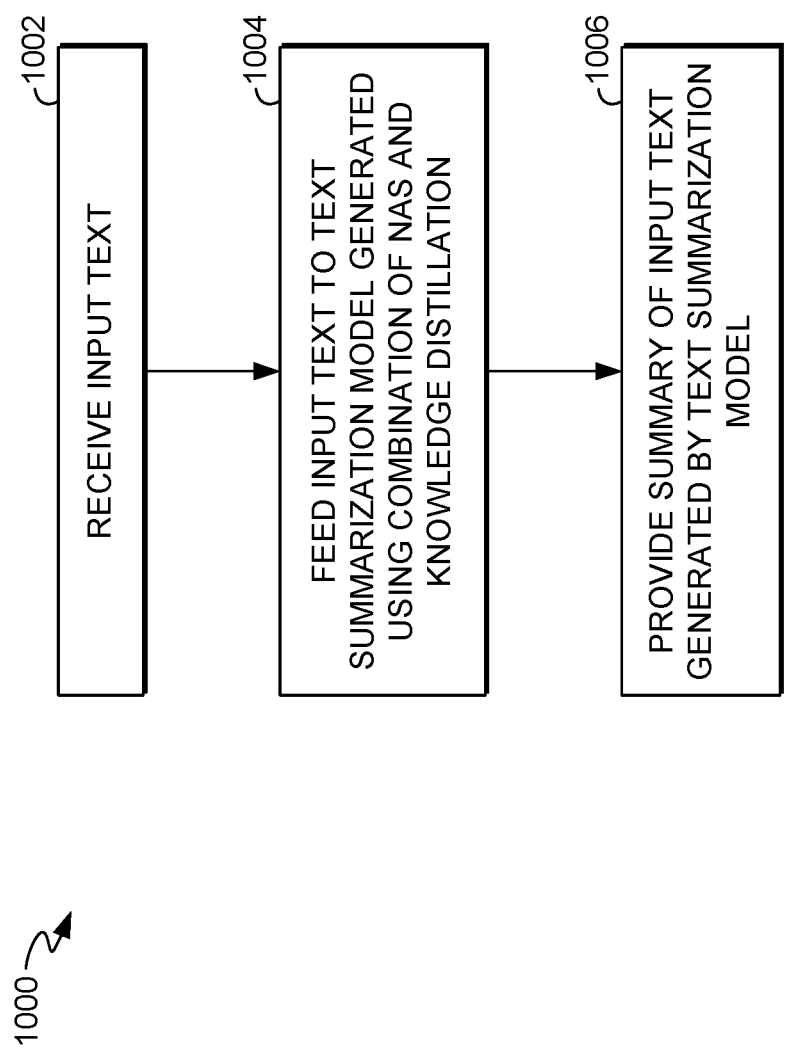
FIG. 10 is a flow diagram showing a method for generating a summary from an input text using a text summarization model in accordance with some implementations of the present disclosure.

Once a text summarization model has been generated, it may be used to generate summaries for input text provided by a user. FIG. 10 is a flow diagram showing a method 1000 for generating a summary using a text summarization model generated in accordance with the technology described herein. As shown at block 1002, an input text is received. For instance, a user may employ a user interface provided by the text summarization system to enter an input text the user wants summarized. In some instances, the user can submit a number of separate input texts to have a separate summary generated for each input text. As shown at block 1004, the text summarization system feeds the input text to the text summarization model that was generated using neural architecture search and knowledge distillation as described hereinabove. A summary of the input text generated by the text summarization model is provided as output, as shown at block 1006. For instance, the text summarization system may provide an output user interface with the summary.

Examples and Performance Evaluation

This section presents results of various types of experiments performed to test the performance, efficiency, and accuracy of text summarization models generated using the technology described herein against benchmark models, and demonstrate how generated text summarization models generalize across different datasets and varying data sizes.

Figure 11:
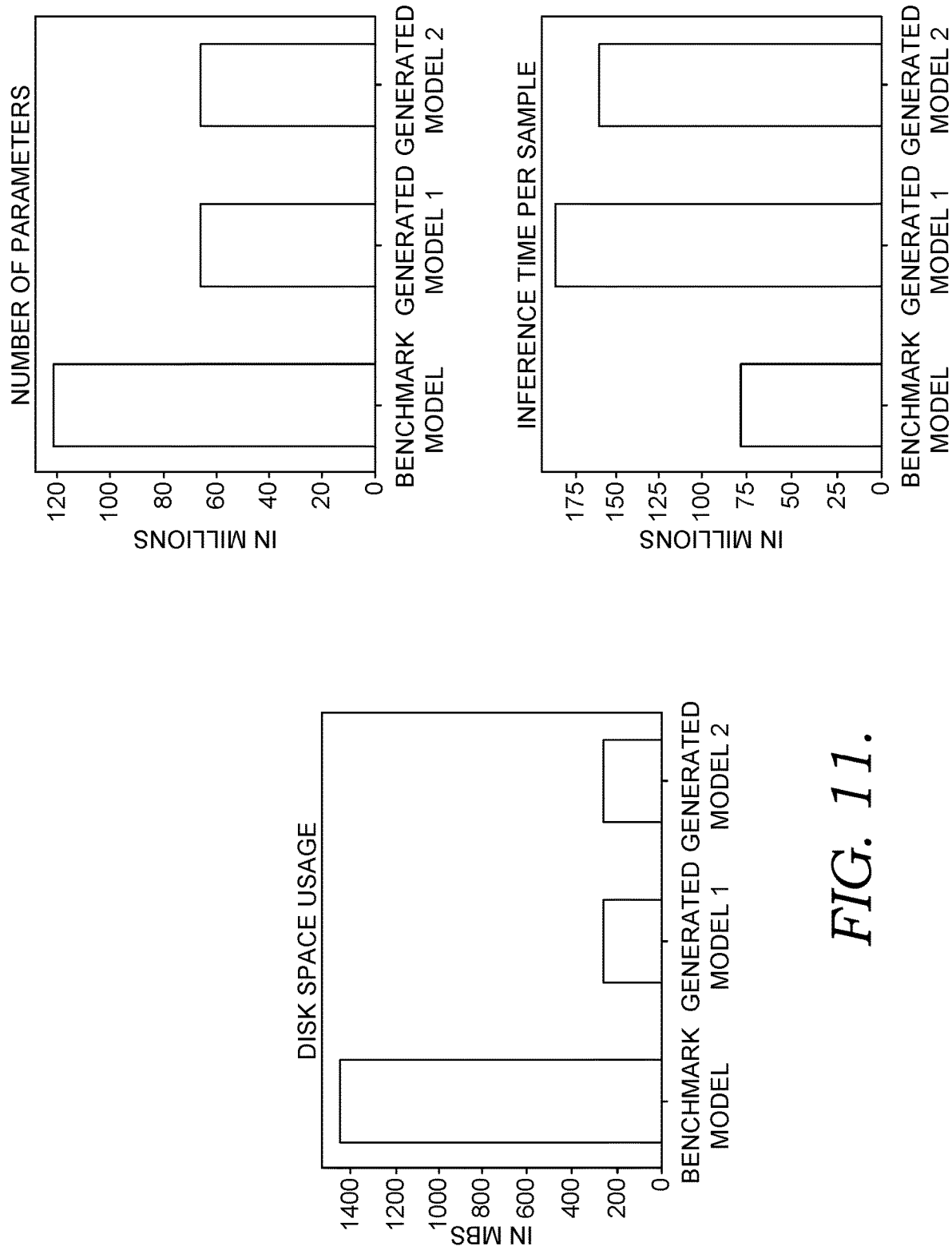
FIG. 11 provides graphs comparing efficiency of text summarization models generated in accordance with some implementations of the present disclosure with a benchmark model.

Extractive Summarization: Table 1 below shows results comparing the performance of two text summarization models generated using the technology described herein against a benchmark model (using BERT) for extractive summarization using two different datasets. FIG. 11 provides graphs comparing efficiency (i.e., number of parameters, disk space, and inference time) of the two generated text summarization models and the benchmark model for extractive summarization.

TABLE 1

| | ROUGE Scores (Extractive Summarization) | | | | | |
| --- | --- | --- | --- | --- | --- | --- |
| | Dataset 1 | | | Dataset 2 | | |
| Model | R1 | R2 | RL | R1 | R2 | RL |
| Benchmark Model | 43.58 | 20.69 | 28.08 | 45.68 | 26.2 | 33.11 |
| Generated Model 1 | 39.10 | 14.68 | 20.78 | 45.68 | 26.38 | 35.04 |
| Generated Model 2 | 41.08 | 18.73 | 26.72 | 45.89 | 26.6 | 35.2 |

The ROUGE scores in Table 1 show that the summaries by the generated text summarization models are close to the state-of-the art benchmark model, indicating that the accuracy/performance of the generated text summarization models are at par with the benchmark model. Additionally, the graphs in FIG. 11 show that the generated text summarization models gain in terms of efficiency with respect to the benchmark model—the number of parameters and space on disk are significantly reduced for the generated text summarization models (although the generated text summarization models lose some performance in terms of inference time due to the use of RNAs and the lack of parallel computation present in the BERT model).

Abstractive Summarization. Table 2 below compares the performance of a text summarization model generated using the technology described herein against a benchmark model (using Lead-K) for abstractive summarization. As can be seen from the ROUGE scores in Table 2, the generated text summarization model provides better performance than the benchmark model.

TABLE 2

| ROUGE Scores (Abstractive Summarization) | | | |
| --- | --- | --- | --- |
| Model | R1 | R2 | R3 |
| Benchmark Model | 24.38 | 7.52 | 17.63 |
| Generated Model | 40.04 | 23.63 | 35.21 |

Figure 12:
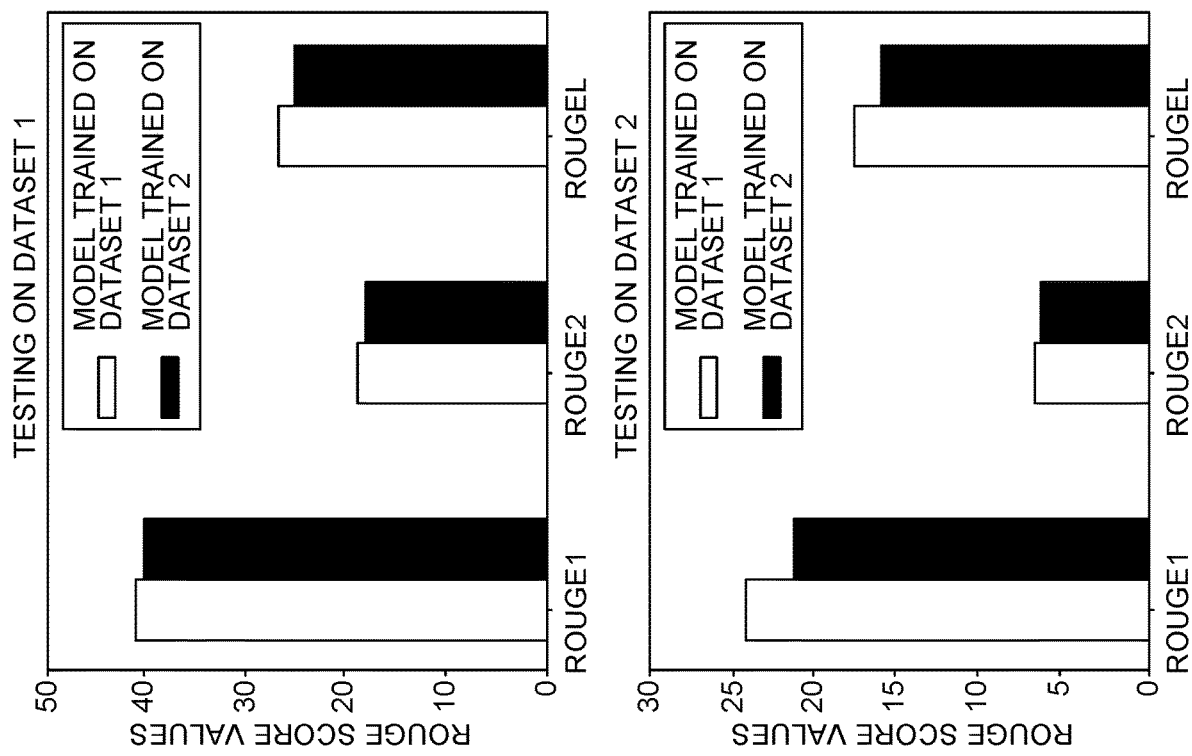
FIG. 12 provides graphs showing results of experiments with text summarization models trained on one dataset and tested on another dataset.

Cross-Dataset: FIG. 12 provides graphs showing the results of experiments with text summarization models trained on one dataset and tested on another dataset. As can be seen from the graphs, the generated text summarization models generalize well across datasets.

Figure 13:
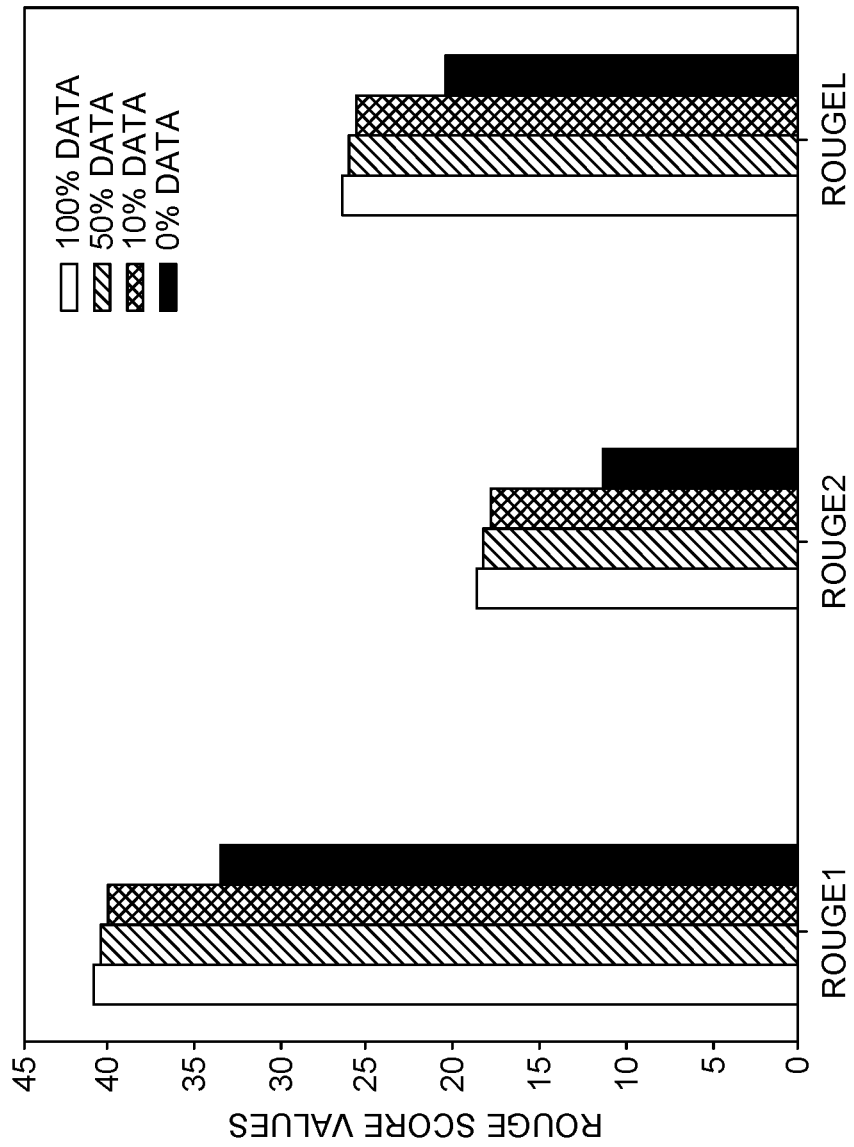
FIG. 13 provides a graph showing results of experiments in which the amount of training data for generating text summarization models was varied.

Training Data Size Variation: FIG. 13 provides a graph showing the results of experiments in which the amount of training data for generating text summarization models was varied. As can be seen from the graph, generated text summarization models do not lose significant performance with decreased amounts of training data. This indicates that the technology described herein is able to generate text summarization models with good performance even with small datasets. Note that 0% data refers to a randomly initialized model that has not been re-trained.

Exemplary Operating Environment

Having described implementations of the present disclosure, an exemplary operating environment in which embodiments of the present invention may be implemented is described below in order to provide a general context for various aspects of the present disclosure. Referring initially to FIG. 14 in particular, an exemplary operating environment for implementing embodiments of the present invention is shown and designated generally as computing device 1400. Computing device 1400 is but one example of a suitable computing environment and is not intended to suggest any limitation as to the scope of use or functionality of the invention. Neither should the computing device 1400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 14, computing device 1400 includes bus 1410 that directly or indirectly couples the following devices: memory 1412, one or more processors 1414, one or more presentation components 1416, input/output (I/O) ports 1418, input/output components 1420, and illustrative power supply 1422. Bus 1410 represents what may be one or more busses (such as an address bus, data bus, or combination thereof). Although the various blocks of FIG. 14 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 14 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 14 and reference to "computing device."

Computing device 1400 typically includes a variety of computer-readable media. Computer-readable media can be any available media that can be accessed by computing device 1400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1412 includes computer storage media in the form of volatile and/or nonvolatile memory. The memory may be removable, non-removable, or a combination thereof. Exemplary hardware devices include solid-state memory, hard drives, optical-disc drives, etc. Computing device 1400 includes one or more processors that read data from various entities such as memory 1412 or I/O components 1420. Presentation component(s) 1416 present data indications to a user or other device. Exemplary presentation components include a display device, speaker, printing component, vibrating component, etc.

I/O ports 1418 allow computing device 1400 to be logically coupled to other devices including I/O components 1420, some of which may be built in. Illustrative components include a microphone, joystick, game pad, satellite dish, scanner, printer, wireless device, etc. The I/O components 1420 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1400. The computing device 1400 may be equipped with depth cameras, such as, stereoscopic camera systems, infrared camera systems, RGB camera systems, and combinations of these for gesture detection and recognition. Additionally, the computing device 1400 may be equipped with accelerometers or gyroscopes that enable detection of motion.

The present invention has been described in relation to particular embodiments, which are intended in all respects to be illustrative rather than restrictive. Alternative embodiments will become apparent to those of ordinary skill in the art to which the present invention pertains without departing from its scope.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
 receiving an input dataset;
 determining a type of text summarization task as an extractive summarization task or an abstractive summarization task;
 fine-tuning a language model for the determined type of text summarization task using the input dataset; and
 generating a text summarization model for the determined type of text summarization task by:

using neural architecture search to learn a network architecture for an encoder of the text summarization model for only the determined type of text summarization task, selecting a pre-defined decoder of the text summarization model based on the determined type of text summarization task, and using knowledge distillation to train the text summarization model on the input dataset using the fine-tuned language model as a teacher model.

2. The one or more computer storage media of claim 1, wherein the input dataset comprises a plurality of examples, each example comprising an example text and an example summary of the example text.

3. The one or more computer storage media of claim 2, wherein the type of text summarization task is automatically determined from the examples in the input dataset.

4. The one or more computer storage media of claim 1, wherein the type of text summarization task is determined based on user input specifying the type of text summarization task.

5. The one or more computer storage media of claim 1, wherein the language model comprises a bidirectional encoder representations from transformers (BERT) model.

6. The one or more computer storage media of claim 1, wherein the neural architecture search employs reinforcement learning to train a controller to learn the network architecture for the text summarization model using a reward determined at each time step based on a validation loss.

7. The one or more computer storage media of claim 6, wherein the controller selects the network architecture of the text summarization model from a search space defining types of cells for the network architecture and how the cells can be connected in the network architecture.

8. The one or more computer storage media of claim 7, wherein the types of cells defined by the search space include: convolutional neural network, recurrent neural network, pooling layers, and multi-head self-attention.

9. The one or more computer storage media of claim 1, wherein the text summarization model is trained using an overall loss based on a weighted contribution from a knowledge distillation loss determined using soft labels from the fine-tuned language model and a cross-entropy loss determined using ground truth labels from the input dataset.

10. The one or more computer storage media of claim 9, wherein the overall loss is determined at sentence level for extractive summarization and at vocab level for abstractive summarization.

11. The one or more computer storage media of claim 6, wherein the controller is a recurrent neural network based controller.

12. The one or more computer storage media of claim 1, wherein, for extractive summarization, the pre-defined decoder of the text summarization model based on the determined type of text summarization task is a scorer function with sigmoid activation that takes in text representations from the encoder and scores each sentence.

13. The one or more computer storage media of claim 1, wherein, for abstractive summarization, the pre-defined decoder of the text summarization model based on the determined type of text summarization task is a recurrent neural network that takes in text representations from the encoder and outputs a generated summary in an auto-regressive manner by decoding a word at each time step.

14. The one or more computer storage media of claim 1, wherein the operations further comprise:
receiving input text; and
generating a summary of the input text using the text summarization model.

15. A computer-implemented method comprising:
receiving input, the input including an input dataset;
fine-tuning a language model for a text summarization task using the input dataset to provide a fine-tuned language model; and
generating a text summarization model for the text summarization task using neural architecture search and knowledge distillation, the text summarization model comprising an encoder and a decoder, the text summarization model being generated by iteratively:
using a controller to select a network architecture for the encoder from a search space;
training the text summarization model to minimize a total loss as a function of a knowledge distillation loss determined using soft labels from the fine-tuned language model and a cross-entropy loss determined using ground truth labels from the input dataset; and
updating the controller using a reward determined based on performance of the text summarization model.

16. The computer-implemented method of claim 15, wherein the input further comprises one or more selected from the following: an indication of the text summarization task, a summary size, a model size, a number of layers, and a number of epochs.

17. The computer-implemented method of claim 15, wherein, for extractive summarization, the decoder is a scorer function with sigmoid activation that takes in text representations from the encoder and scores each sentence, and wherein, for abstractive summarization, the decoder is a recurrent neural network that takes in text representations from the encoder and outputs a generated summary in an auto-regressive manner by decoding a word at each time step.

18. The computer-implemented method of claim 15, wherein the search space defines types of cells for the network architecture and how the cells can be connected in the network architecture, and wherein the types of cells defined by the search space include: convolutional neural network, recurrent neural network, pooling layers, and multi-head self-attention.

19. The computer-implemented method of claim 15, wherein the performance of the text summarization model is based on a validation loss determined for the text summarization model.

20. A computer system comprising:
a processor; and
a computer storage medium storing computer-useable instructions that, when used by the processor, causes the computer system to perform operations comprising:
receiving user input comprising input text;
feeding the input text to a text summarization model, the text summarization model generated by:
using neural architecture search to learn a network architecture of an encoder of the text summarization model for only a determined type of text summarization task,
selecting a pre-defined decoder of the text summarization model based on the determined type of text summarization task, and using knowledge distillation from a language model fine-tuned for the determined type of text summarization task based on an input dataset; and providing, in response to the user input, a summary of the input text generated by the text summarization model.

* * * * *